United States Patent [19]
Muller et al.

[15] 3,707,065
[45] Dec. 26, 1972

[54] PROCESS FOR THE PURIFICATION OF PYROLYTIC GAS MIXTURES

[72] Inventors: Hans Joachim Muller, Leverkusen; Horst Bruckner, Dormagen, both of Germany

[73] Assignee: Erdolchemile Gesellschaft mit beschrankter Haftung, Cologne, Germany

[22] Filed: Aug. 17, 1971

[21] Appl. No.: 172,575

[30] Foreign Application Priority Data

Aug. 21, 1970 Germany..................P 20 41 549.0

[52] U.S. Cl..........................................55/32, 208/188
[51] Int. Cl. ...............................................B01d 53/14
[58] Field of Search.........23/312 A; 55/32, 171–177; 208/188; 260/681.5

[56] References Cited

UNITED STATES PATENTS 3,349,544 10/1967 Arnold et al. .............................55/32
3,655,806 4/1972 Brandt et al........................260/681.5

*Primary Examiner*—Charles N. Hart
*Attorney*—Ralph D. Dinklage et al.

[57] ABSTRACT

Steam, diene hydrocarbons, styrene and methylstyrenes are removed from crude gas by scrubbing the gas with a regeneratable glycol extractant and thereafter removing polymerizable hydrocarbons and/or polymers dissolved in the glycol by a liquid-liquid extraction.

4 Claims, No Drawings

PROCESS FOR THE PURIFICATION OF PYROLYTIC GAS MIXTURES

BACKGROUND

The invention relates to the removal of steam from diolefinic crude gases by means of a regeneratable extractant. The use of di-, tri- or tetraethylene glycol as an extractant for steam has already been described (R.L. Huntington, Natural Gas and Natural Gasoline, McGraw Hill (1950)).

In the thermal cracking or pyrolysis of hydrocarbons carried out mainly for the production of olefines, steam is added as a diluent for the cracking process. The crude gas obtained on pyrolysis is subjected to a multi-stage compression in known manner so that it may subsequently be separated into the desired fractions, e.g., the hydrogen fraction, ethylene and the propylene fraction by cooling, fractional condensation and low-temperature distillation (see Ullman's Enzyklopadie der technischen Chemie, volume 1, pages 333 – 409).

The crude gas contains steam which, as is well known, is removed by means of a solid adsorbent such as aluminum oxide or molecular sieves before the crude gas enters the low-temperature zone of the plant (see ibid. and Chem. Trade J. 154 (1969) No. 4014, page 697).

It is also known in the art to remove steam by a continuous extraction process using a regeneratable extractant such as an ethylene glycol of the general formula $C_x H_y O_z$ wherein $x = 2, 4, 6$ or $8; y = 6, 10, 14$ or $18$ and $z = 2, 3, 4$ or $5$ and/or a propylene glycol of the general formula $C_x H_y O_z$ wherein $x + 3, 6$ or $9; y = 8, 14$ or $20$ and $z = 2, 3$ or $4$ (R.L. Hungington, Natural Gasoline, McGraw Hill (1950).

It is known that the crude gas obtained by the pyrolysis of hydrocarbons is compressed to pressures of 10 – 50 at. abs. pressure, preferably 20 – 40 at. abs. pressure in multi-stage crude gas compressors (see Ullmann's Enzyklopadie der technischen Chemie, volume 1, pages 333 – 409).

It is also known that the crude gas obtained by the pyrolytic decomposition of hydrocarbons contains, furthermore, $C_3 - C_{10}$ diolefinic compounds such as propadiene, butadienes, pentadienes, cyclopentadiene, hexadienes, methylpentadienes, dimethylbutadienes, heptadienes, cyclohexadienes, methylcyclopentadienes, dicyclopentadienes and isoprene and also styrene, methylstyrenes and dimethylstyrenes.

In the pressure stages of 2 – 20 abs. at. of the crude gas compression and especially in the 3 – 13 atmospheres stages, the crude gas still contains $C_5 - C_8$ diolefinic compounds especially $C_5$-diolefines such as isoprene, cyclopentadiene, pentadiene-(1,3) and pentadiene-(1,2) and also styrene and methyl styrenes.

SUMMARY

In the process of the present invention for removing steam from crude gas, it has now been found that, when the crude gas is dried in the pressure range of 2 – 20 atmospheres (absolute pressure), especially 5 – 15 atmospheres, using a regeneratable extractant such as monoethylene glycol, diethylene glycol, triethylene glycol or tetraethylene glycol and/or monopropylene glycol, dipropylene glycol or tripropylene glycol, the diolefinic components in the crude gas as well as styrene and the methylstyrenes are partly dissolved in the glycol and cause the formation of polymers.

Regeneration of the aqueous glycol, which is normally carried out by heating and distilling of the steam at temperatures of 100° – 250° C, preferably 150° – 220° C, causes the formation of polymers which gums up the whole glycol washing plant.

It has been found that the $C_5-C_{10}$ diene hydrocarbons and/or styrene and/or methylstyrene dissolved in glycols of the general formulas: ethylene glycol; $C_x H_y O_z$, where $x = 2, 4, 6$ or $8; Y = 6, 10, 14$ or $18$ and $z = 2, 3, 4$ or $5$ and propylene glycol: $C_x H_y O_z$, where $x = 3, 6$ or $9; y = 8, 14$ or $20$ and $z = 2, 3$ or $4$ may be removed by treating the glycol with a solvent, e.g., a paraffinic-naphthenic solvent. The polymers already formed and the hydrocarbons dissolved in the glycol are extracted from the glycol by the solvent. The solvent used for the hydrocarbons and/or polymers dissolved in the glycol should be only slightly soluble in the glycol or immiscible with the glycol.

DESCRIPTION

The solvent used for the hydrocarbons and polymers in the glycol may be a light petroleum fraction of the type used as a feed for the thermal cracking process. Products such as the hydrocarbon fraction which remains behind as a so-called raffinate when benzene and/or toluene and/or xylenes have been extracted from the products of pyrolysis or cracking of petroleum hydrocarbons are also suitable as solvent. Pentanes, a hexane-heptane fraction, isooctane and octanes are also suitable solvents.

The solvent may therefore consist of paraffinic and/or naphthenic hydrocarbons and may also contain 5–20 percent by weight and preferably 5 – 10 percent by weight, of aromatic hydrocarbons as, for example, in the case of a straight-run naphtha fraction.

Furthermore, it is advantageous to reduce the formation of polymer or the concentration of polymerizable hydrocarbons in the glycol used as an extractant by employing the measures described below.

The solubility of the hydrocarbons and especially of the diolefinic hydrocarbons is reduced by charging the glycol with water to the optimum extent.

By subjecting the glycol which is charged with water and hydrocarbons to a preliminary degasification, a substantial proportion of the polymerizable hydrocarbons may be removed from the glycol before it is exposed to high temperatures in the regeneration zone.

The procedure is generally as follows: the compressed crude gas is treated in counter-current with one of the above-mentioned glycols in a gas scrubbing column to remove the steam. In addition to water, 2 – 12 percent by weight of hydrocarbons and especially diolefinic and aromatic hydrocarbons are dissolved in the glycols of the above-mentioned general formulas. The glycol charged with water and hydrocarbons is then subjected to a partial or complete liquid-liquid extraction by means of a paraffinic and/or naphthenic or paraffinic-naphthenic-aromatic hydrocarbon mixture, the polymers and hydrocarbons dissolved in the glycol being removed to such an extent that blocking of the apparatus by polymers will no longer occur in the subsequent regeneration of the extractant.

It is a special advantage of the process according to the invention, that as a result of the extraction of the polymers and polymer-forming hydrocarbons from the glycol, the process of scrubbing the crude gas with the glycol to remove steam may be carried out at low crude gas pressures and, therefore, at high concentrations, e.g., of $C_5$ hydrocarbons and also of $C_6$-$C_8$ hydrocarbons in the crude gas. If the process according to the invention is not used, continuous extraction for the removal of steam from the crude gas can only be carried out at low concentrations of $C_5$ – $C_8$ hydrocarbons, i.e., at high pressure stages of the crude gas compression.

EXAMPLE 1

A crude gas obtained from the pyrolysis of a light petroleum fraction was compressed in a compressor to an abs. pressure of 4 – 6 atmospheres and freed from steam by scrubbing in this pressure range. Triethylene glycol used as a scrubbing agent dissolved not only the steam in the crude gas but also 5 – 7 percent of the hydrocarbons which consisted mainly of $C_5$ hydrocarbons such as isoprene, cyclopentadiene, pentadiene-(1,3), pentadiene-(1,2) benzene, toluene and m-, p and o-xylene and also contained styrene and methylstyrenes. The glycol from the scrubbing column was passed through a regeneration column where it was heated to temperatures of 160° – 220° C to remove the water from it. As is well known, heating of the glycol caused the formation of polymers from the diolefinic hydrocarbons cyclopentadiene, isoprene, pentadiene-(1,3), pentadiene-(1,2) and from styrene. These compounds were not volatile and were deposited as a polymer mainly in the regeneration zone of the glycol scrubbing plant. The polymers formed may, for example, have the following composition:

| | |
|---|---|
| C:H ratio | $C_5H_6$ |
| Molecular weight | 3.190 |
| Melting point | 456° C with decomposition |
| Double bounds determined by the bromine number | 2. |

These results showed that the polymer consisted of 48 – 49 mols of cyclopentadiene.

The glycol charged with diene hydrocarbons and polymers such as di-, tri-, tetra- and pentacyclopentadiene may be freed from the polymers and the polymer-forming hydrocarbons by treating it with an extractant such as a straight-run-naphtha.

EXAMPLE 2

A glycol was removed from an industrial glycol scrubbing plant contained polymers as evidenced by the evaporation residue. This glycol was treated with various proportions of straight-run-naphtha as extractant for various lengths of time in a laboratory separating funnel and the proportion of extracted polymers was determined.

The results of these washing extraction experiments for the polymer are summarized in the table below:

In a thermal cracking plant for the pyrolytic decomposition of straight-run-naphtha for the preferential production of olefine hydrocarbons, 80,000 $Nm^3$ per hour of pyrolytic gas were introduced into a countercurrent scrubbing plant containing triethylene glycol to remove the steam in the pyrolytic gas, the process being carried out at a pressure of 6.2 abs. atmospheres.

When the glycol used as a scrubbing agent was charged with water and hydrocarbons, it was passed through an extraction apparatus containing a straight-run naphtha as an extractant for the removal of a portion of the polymerizable hydrocarbons and of the polymers already formed.

The straight-run naphtha used as an extractant had the following composition:

| | |
|---|---|
| n-paraffins | 380% by weight |
| isoparaffins | 34.0% by weight |
| naphthenes | 17.2% by weight |
| aromatic hydrocarbons | 6.3% by weight |
| other $C_9$ and higher hydrocarbons | 4.5% by weight |

Conditions of extraction employed for the removal of polymers:

| | |
|---|---|
| temperature | 28°C. |
| hydrocarbon contents of the glycol | |
| before extraction | 4.7% by weight |
| after extraction | 3.3% by weight |

It was found that on extraction with the paraffinic-naphthenic-aromatic extractant, the diolefinic hydrocarbons were removed from the glycol and a certain increase in paraffinic, naphthenic and aromatic hydrocarbons was recorded.

The exchange between extractant and glycol of polymerizable hydrocarbons on the one hand and thermally stable hydrocarbons consisting mainly of paraffins on the other hand is shown in the following table:

| Composition | Reduction in amount of polymerizable hydrocarbons in % by weight | Increase in non-polymerizable hydrocarbons in % by weight |
|---|---|---|
| $C_3$ | 20 | |
| $C_4$ | 38 | |
| $C_5$-dienes | 20 | |
| $C_6$-dienes | 32 | |
| styrene + DCP | 25 | |
| $C_5$-paraffins | | 52 |
| $C_6$-paraffins | | 33 |
| $C_7$-paraffins | | 19 |
| $C_8$-aromatic hydrocarbons | | 23 |
| Others | | 7.5 |

It was found to be particularly advantageous that, in this extraction process, polymers which are already

| Starting material, proportions by volume of TEG*:naphtha | Extracted from TEG* by naphtha, volumes percent | | | Evaporation residue of TEG* after extraction with naphtha, weight percent | | | Density of TEG* after extraction at 15° C. | | |
|---|---|---|---|---|---|---|---|---|---|
| | ½ min. | 1 min. | 2 mins. | ½ min. | 1 min. | 2 min. | ½ min. | 1 min. | 2 mins |
| TEG*/starting material | | | | 0.353 | 0.353 | 0.353 | 1.091 | 1.091 | 1.091 |
| 1:2 | 6.7 | 6.7 | 7.9 | 0.246 | 0.193 | 0.116 | | | 1.112 |
| 1:1 | 6.3 | 6.5 | 6.2 | 0.235 | 0.189 | | 1.108 | 1.110 | 1.108 |
| 1:0.75 | 4.7 | 4.9 | 4.8 | 0.235 | 0.238 | 0.192 | 1.111 | 1.111 | 1.110 |
| 1:0.50 | 5.1 | 5.4 | 5.3 | 0.233 | 0.193 | 0.176 | 1.015 | 1.099 | 1.094 |

*TEG denotes triethylene glycol.

formed are removed from the glycol by being dissolved in the straight-run naphtha.

Evaporation residue naphtha:
- before extraction: <mg/100 cc
- after extraction: 12 mg/100 cc
- Quantity of polymer removed by extraction: 2.5 kg/day This extraction caused the polymer content in the glycol to be adjusted to such low concentrations that no deposits of polymers were formed even when the process was carried out continuously for 4 – 5 months, whereas, previously, when the process was carried out without extraction, heavy deposits were found after only 3 – 4 weeks, mainly in the hot part of the glycol scrubbing plant.

What is claimed is:

1. Process for removing steam from crude gas which contains compounds selected from the group of $C_5$–$C_{10}$ diene hydrocarbons, styrene, methylstyrenes and mixtures of the foregoing which comprises scrubbing said crude gas with a regeneratable glycol extractant to remove said steam and thereafter removing polymerizable hydrocarbons and polymers dissolved in said glycol during said scrubbing by a liquid-liquid extraction using a hydrocarbon solvent which is immiscible or only slightly soluble in glycol.

2. Process of claim 1 wherein the glycol is an alkylene glycol containing from 2–9 carbon atoms.

3. Process of claim 1 wherein said glycol is selected from the group of mono-, di-, tri- and tetra-ethylene glycol, mono-, di- and tri-propylene glycol and mixtures of the foregoing.

4. Process of claim 1 wherein said hydrocarbon solvent is selected from the group of paraffinic hydrocarbons, naphthenic hydrocarbons, aromatic hydrocarbons and mixtures of the foregoing.

* * * * *